United States Patent
Brenmiller et al.

(10) Patent No.: US 10,145,365 B2
(45) Date of Patent: Dec. 4, 2018

(54) INTEGRATED THERMAL STORAGE, HEAT EXCHANGE, AND STEAM GENERATION

(71) Applicant: BRENMILLER ENERGY LTD., Tel Aviv (IL)

(72) Inventors: Avi Brenmiller, Ramat Hasharon (IL); Rami Ezer, Ramat Gan (IL)

(73) Assignee: BRENMILLER ENERGY LTD., Rosh HaAyin (IL)

( * ) Notice: Subject to any disclaimer, the term of this patent is extended or adjusted under 35 U.S.C. 154(b) by 477 days.

(21) Appl. No.: 14/766,136

(22) PCT Filed: Jan. 22, 2014

(86) PCT No.: PCT/IB2014/058458
§ 371 (c)(1),
(2) Date: Aug. 6, 2015

(87) PCT Pub. No.: WO2014/147491
PCT Pub. Date: Sep. 25, 2014

(65) Prior Publication Data
US 2015/0377221 A1    Dec. 31, 2015

Related U.S. Application Data

(60) Provisional application No. 61/803,518, filed on Mar. 20, 2013.

(51) Int. Cl.
*F28D 17/02* (2006.01)
*F03G 6/06* (2006.01)
(Continued)

(52) U.S. Cl.
CPC .............. *F03G 6/065* (2013.01); *F24S 60/00* (2018.05); *F28D 17/00* (2013.01);
(Continued)

(58) Field of Classification Search
CPC ...... F24J 2/34; F28D 20/0052; F28D 20/0056
See application file for complete search history.

(56) References Cited

U.S. PATENT DOCUMENTS 4,138,995 A    2/1979 Yuan
4,205,655 A    6/1980 Hunt
(Continued)

FOREIGN PATENT DOCUMENTS

CN    102072582 A    5/2011
CN    102607196 A    7/2012
(Continued)

OTHER PUBLICATIONS

International Application # PCT/IB2016/053014 Search Report dated Sep. 12, 2016.
(Continued)

*Primary Examiner* — Jonathan Matthias
(74) *Attorney, Agent, or Firm* — D. Kligler IP Services Ltd.

(57) ABSTRACT

Heat exchange apparatus (24, 80) includes first heat transfer tubes (50), contained within an enclosure (43) and coupled to receive a first fluid heated by an energy source (22, 36). Second heat transfer tubes (52) are interleaved with the first heat transfer tubes within the enclosure so as to heat a second fluid contained in the second heat transfer tubes by transfer of heat from the first fluid, and are coupled to output the heated second fluid to drive target equipment (30). A heat storage medium (48) fills the enclosure.

21 Claims, 7 Drawing Sheets

(51) Int. Cl.
  *F28D 20/00* (2006.01)
  *F28D 17/00* (2006.01)
  *F24S 60/00* (2018.01)
  *F24S 10/30* (2018.01)
  *F28D 7/00* (2006.01)
  *F28F 1/22* (2006.01)
  *F28F 1/32* (2006.01)
  *F24S 23/74* (2018.01)

(52) U.S. Cl.
  CPC ..... *F28D 20/0052* (2013.01); *F28D 20/0056* (2013.01); *F24S 10/30* (2018.05); *F24S 23/74* (2018.05); *F28D 7/0008* (2013.01); *F28D 7/0016* (2013.01); *F28F 1/22* (2013.01); *F28F 1/32* (2013.01); *Y02E 10/46* (2013.01); *Y02E 60/142* (2013.01)

(56) References Cited

U.S. PATENT DOCUMENTS

| | | |
|---|---|---|
| 4,240,406 A | 12/1980 | Hutchison |
| 4,484,568 A | 11/1984 | Witt |
| 4,678,292 A | 7/1987 | Miyatani et al. |
| 4,820,033 A | 4/1989 | Sick |
| 5,241,824 A | 9/1993 | Parker et al. |
| 9,212,831 B2 | 12/2015 | Dominguez Abascal et al. |
| 2005/0139210 A1 | 6/2005 | Eickhoff |
| 2006/0150967 A1 | 7/2006 | Hoelle et al. |
| 2007/0062677 A1 | 3/2007 | Usui et al. |
| 2008/0308094 A1 | 12/2008 | Johnston |
| 2009/0183731 A1 | 7/2009 | Capan |
| 2009/0223509 A1 | 9/2009 | Hoellenriegel |
| 2010/0065045 A1 | 3/2010 | Jennings |
| 2010/0072730 A1 | 3/2010 | Shapiro |
| 2010/0206294 A1 | 8/2010 | Blair et al. |
| 2010/0252030 A1 | 10/2010 | Marcotte et al. |
| 2011/0049992 A1 | 3/2011 | Sant Anselmo et al. |
| 2011/0073104 A1 | 3/2011 | Dopp et al. |
| 2011/0100358 A1 | 5/2011 | Perisho |
| 2011/0168161 A1 | 7/2011 | Capan |
| 2011/0186041 A1 | 8/2011 | Kalina |
| 2011/0220096 A1 | 9/2011 | Margankunte et al. |
| 2012/0036676 A9 | 2/2012 | Ota |
| 2012/0285442 A1 | 11/2012 | Hung |
| 2013/0025817 A1* | 1/2013 | Callaghan ........... F28D 20/0056 165/10 |
| 2013/0112188 A1 | 5/2013 | Reynolds |
| 2014/0347756 A1 | 11/2014 | Brenmiller et al. |
| 2015/0108763 A1* | 4/2015 | Yogev .................. F03D 9/007 290/55 |
| 2016/0003496 A1 | 1/2016 | Brenmiller et al. |

FOREIGN PATENT DOCUMENTS

| | | |
|---|---|---|
| CN | 202885310 U | 4/2013 |
| DE | 102010014789 A1 | 10/2011 |
| DE | 102010038054 A1 | 3/2012 |
| EP | 2221558 A1 | 8/2010 |
| KR | 100911863 B1 | 8/2009 |
| WO | 2008145551 A1 | 12/2008 |
| WO | 2010004420 A2 | 1/2010 |
| WO | 2011029852 A1 | 3/2011 |
| WO | 2011068528 A1 | 6/2011 |
| WO | 2011109885 A1 | 9/2011 |
| WO | 2011134759 A1 | 11/2011 |
| WO | 2012025527 A2 | 3/2012 |
| WO | 2012113478 A1 | 8/2012 |
| WO | 2013002747 A1 | 1/2013 |
| WO | 2013016828 A1 | 2/2013 |

OTHER PUBLICATIONS

European Application # 14767720.7 Search Report dated Oct. 20, 2016.
European Application # 14773892.6 Search Report dated Sep. 22, 2016.
International Application # PCT/IB2014/059559 Search Report dated Jun. 26, 2014.
International Application # PCT/IB2014/058458 Search Report dated Jun. 5, 2014.
International Application # PCT/IB2014/061184 Search Report dated Sep. 11, 2014.
International Application # PCT/IB2014/059189 Search Report dated Jun. 19, 2014.
International Application # PCT/IB2014/066271 Search Report dated Mar. 30, 2015.
Turner, R. H., "High Temperature Thermal Energy Storage in Steel and Sand", JPL Publication 80-35 (Jet Propulsion Laboratory), 94 pages, Pasadena, USA, Dec. 15, 1979.
Kotze et al., "A combined latent thermal energy storage and steam generator concept using metallic phase change materials and metallic heat transfer fluids for concentrated solar power", 8 pages, Stellenbosch University, South Africa, Jul. 29, 2011.

* cited by examiner

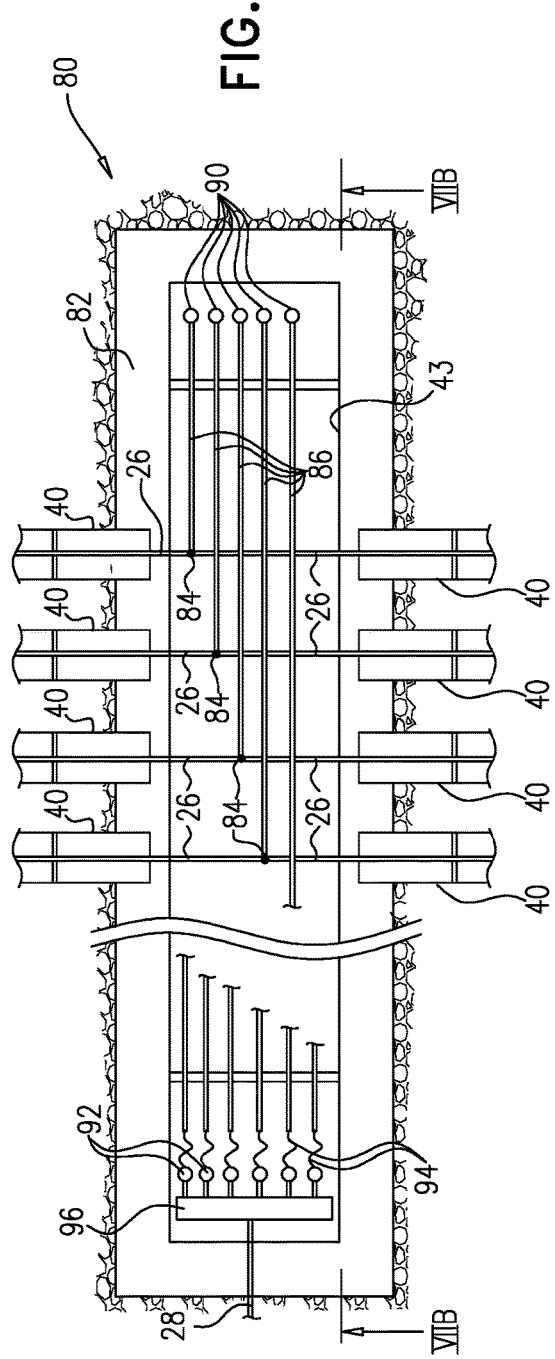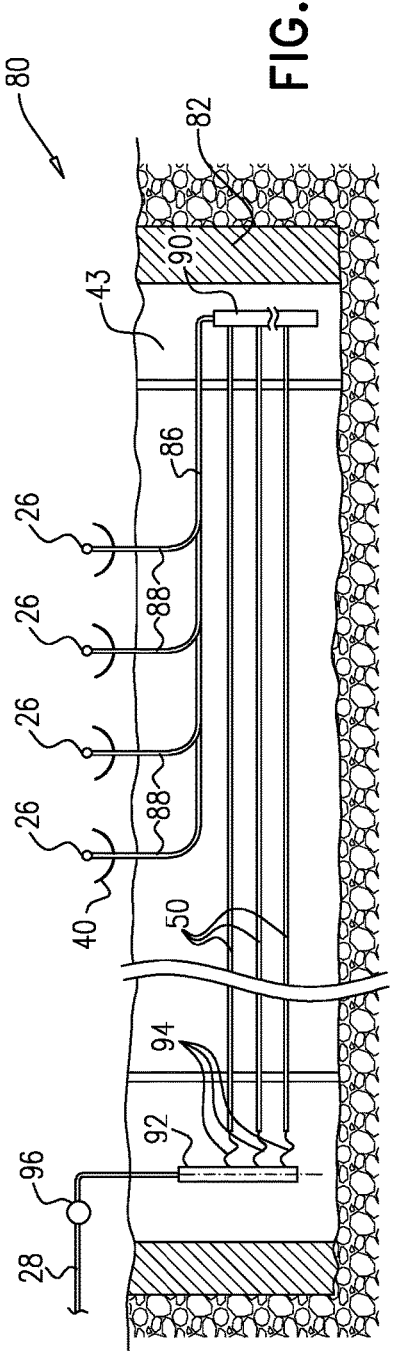

INTEGRATED THERMAL STORAGE, HEAT EXCHANGE, AND STEAM GENERATION

CROSS-REFERENCE TO RELATED APPLICATION

This application claims the benefit of U.S. Provisional Patent Application 61/803,518, filed Mar. 20, 2013, which is incorporated herein by reference.

FIELD OF THE INVENTION

The present invention relates generally to thermal energy generation, such as in solar thermal energy systems, and particularly to methods and apparatus for storage of thermal energy.

BACKGROUND

In solar thermal energy systems, the rays of the sun are concentrated to heat a fluid to high temperature (generally in the range of 300-550° C.). Typically, the heated fluid is piped from the solar concentrator to drive a turbine in order to generate electricity.

Like other types of solar energy systems, however, solar thermal energy systems suffer from the inherent problem that they collect energy only while the sun is shining at a sufficiently high elevation, i.e., substantially less than 50% of the time on average. Furthermore, the hours of energy collection generally do not overlap with the hours of peak electrical energy consumption. Various solutions have therefore been proposed and put into practice to store collected thermal energy for use in driving turbines during off-hours. Most of the interest in this regard has focused on materials that have high heat capacity and are also good thermal conductors, such as molten salts.

Other sorts of materials for heat storage have also been proposed and tested. For example, Robert H. Turner describes experimental evaluation of various materials for such purposes in "High Temperature Thermal Energy Storage in Steel and Sand," JPL Publication 80-35 (Jet Propulsion Laboratory, Pasadena, Calif., 1979). This study evaluated hollow steel ingots, pipes embedded in concrete, and pipes buried in sand. It concluded that for large-scale thermal storage units, the sand-pipe approach offers attractive possibilities.

SUMMARY

Embodiments of the present invention that are described hereinbelow provide improved methods and apparatus for storage of thermal energy, as well as solar thermal energy systems incorporating such means of storage.

There is therefore provided, in accordance with an embodiment of the present invention, heat exchange apparatus, including first heat transfer tubes, contained within an enclosure and coupled to receive a first fluid heated by an energy source. Second heat transfer tubes are interleaved with the first heat transfer tubes within the enclosure so as to heat a second fluid contained in the second heat transfer tubes by transfer of heat from the first fluid, and which are coupled to output the heated second fluid to drive target equipment. A heat storage medium fills the enclosure.

In some embodiments, the enclosure includes an excavated trench. The heat storage medium may include earth, possibly earth excavated from the trench and then refilled into the trench after installation of the heat transfer tubes therein.

Additionally or alternatively, at least 50% by volume of the heat storage medium may consist of igneous rocks. In one embodiment, the heat storage medium includes an external insulating layer including tuffaceous rock. Further additionally or alternatively, the heat storage medium may include a particulate material that fills spaces between the igneous rocks, wherein the particulate material may include pulverized igneous rock and/or metal fragments.

In a disclosed embodiment, the apparatus includes fins coupled externally to the heat transfer tubes within the enclosure.

In some embodiments, the first and second heat transfer tubes are arranged to run through the enclosure along parallel, respective paths between first and second ends of the interleaved tubes, and are coupled respectively to the energy source and the target equipment so the heated first fluid enters the first heat transfer tubes at the first end and cools along the respective path before exiting from the second end, and the heated second fluid enters the second end and exits from the first end after receiving the heat from the first fluid along the respective path.

In one embodiment, the first heat transfer tubes are coupled so that the cooled first fluid returns from the second end to be re-heated by the energy source, and the second heat transfer tubes are coupled to receive at the second end the second fluid that has been cooled in driving the target equipment.

The apparatus may include a connection manifold to which the first and second ends of the first and second heat transfer tubes are coupled, wherein the respective paths are linear paths, which run from the connection manifold along a length of the enclosure and are bent to return along the length of the enclosure to the connection manifold. Alternatively, the respective paths are serpentine paths, including multiple bends between the first and second ends. The connection manifold may be contained within the heat storage medium in the enclosure.

In a disclosed embodiment, the heat storage medium is configured to simultaneously receive the heat from the first fluid conveyed by the first heat transfer tubes and to release at least a part of the heat to the second fluid via the second heat transfer tubes for driving the target equipment.

Typically, the energy source includes a diurnal source, which heats the first fluid during daylight hours, and the heat storage medium is configured to receive and store the heat from the first fluid during the daylight hours and to release the heat to the second fluid during nighttime hours.

In some embodiments, the first fluid is gaseous at standard temperature and pressure (STP), while the second fluid is liquid at STP. In one such embodiment, the first fluid includes carbon dioxide, and the second fluid includes water. The first fluid may include a rare gas selected from a group of rare gases consisting of argon, krypton and xenon.

There is also provided, in accordance with an embodiment of the present invention, a system for energy generation, including one or more solar collectors, which are configured to concentrate solar energy so as to heat a first fluid, and a turbine, which is coupled to be driven by a heated second fluid so as to generate electricity. Heat storage apparatus in the system includes first heat transfer tubes, contained within an enclosure and coupled to receive the heated first fluid from the solar collectors; second heat transfer tubes, which are interleaved with the first heat transfer tubes within the enclosure so as to heat the second fluid contained in the second heat transfer tubes by transfer of heat from the first fluid, and which are coupled to output the heated second fluid to drive the turbine; and a heat storage medium, which fills the enclosure.

In some embodiments, the solar collectors are deployed over a field, and at least a part of the heat storage apparatus is buried beneath the field. Typically, the enclosure includes a trench excavated in the field.

The heat storage apparatus may be configured to simultaneously receive the heat from the first fluid and to release at least a part of the heat to the second fluid for driving the turbine. In a disclosed embodiment, the heat storage apparatus is configured to control a rate of discharge of the heat from the apparatus by regulating a flow of the second fluid through the second heat transfer tubes.

In some embodiments, the system includes a backup energy source, which is configured to heat the first fluid by combustion of a fuel, and is coupled to convey the heated first fluid to the first heat transfer tubes so as to supplement the heat provided by the solar collectors. The backup energy source may be configured to heat the first fluid simultaneously with heating of the first fluid by the solar collectors.

There is additionally provided, in accordance with an embodiment of the present invention, a system for energy generation, which includes an array of solar collectors, which have respective first and second ends and respective collector axes, extending between the first and second ends, that are mutually parallel along a first direction, and which are configured to concentrate solar energy so as to heat a fluid. Heat storage apparatus in the system includes heat transfer tubes, contained within an enclosure, and a heat storage medium, which fills the enclosure. The apparatus has a longitudinal axis that runs in a second direction, perpendicular to the first direction, and is positioned adjacent to the first ends of the solar collectors. Hot transfer pipes are coupled to convey the heated fluid from each of the solar collectors to the heat transfer tubes in the heat storage apparatus, each of the hot transfer pipes entering the enclosure at a point adjacent to the first end of a respective solar collector.

In a disclosed embodiment, the heat storage apparatus includes a connection manifold, which is configured to receive the heated fluid from the solar collectors and to distribute the heated fluid to the heat transfer tubes, wherein the connection manifold is contained within the heat storage medium in the enclosure.

The system may also include a cool transfer pipe, which is coupled to convey the fluid from the heat transfer tubes, following transfer of heat from the fluid to the heat storage medium, out of the heat storage apparatus to the second ends of the solar collectors.

There is further provided, in accordance with an embodiment of the present invention, a method for energy storage, which includes excavating a trench, thereby removing earth from the ground. Heat transfer tubes are deployed within the trench and are coupled to receive a heated fluid from an energy source. The trench is filled so as to cover the heat transfer tubes with the earth that was removed from the ground, whereby heat transferred to the tubes by the heated fluid is stored at least partly by the earth in the trench.

There is moreover provided, in accordance with an embodiment of the present invention, a method for energy storage, which includes providing an enclosure and interleaving first and second heat transfer tubes within the enclosure. The first heat transfer tubes are coupled to receive a first fluid heated by an energy source. The second heat transfer tubes are coupled to receive and heat a second fluid by transfer of heat from the first fluid, and to output the heated second fluid to drive target equipment. The enclosure containing the interleaved first and second heat transfer tubes is filled with a heat storage medium.

In one embodiment, the heat storage medium includes earth, and filling the enclosure includes compacting and then wetting the earth.

In some embodiments, the method includes coupling one or more solar collectors to heat the first fluid for input to the first heat transfer tubes, and providing a backup energy source to heat the first fluid by combustion of a fuel. The backup energy source is coupled to convey the heated first fluid to the first heat transfer tubes so as to supplement the heat provided by the solar collectors. Coupling the backup energy source may include heating the first fluid using the backup energy source simultaneously with heating of the first fluid by the solar collectors.

In some embodiments, the method includes controlling a flow of the second fluid so as to simultaneously receive the heat from the first fluid and release at least a part of the heat for driving the target equipment. Controlling the flow typically includes controlling a rate of discharge of the heat from the heat storage medium by regulating the flow of the second fluid through the second heat transfer tubes. The discharge may be regulated without adjustment of valves other than to control a total flow rate.

The present invention will be more fully understood from the following detailed description of the embodiments thereof, taken together with the drawings in which:

BRIEF DESCRIPTION OF THE DRAWINGS

FIG. 7A is a schematic top view of heat storage and transfer apparatus, in accordance with an embodiment of the present invention; and FIG. 7B is a schematic, sectional view of the apparatus of FIG. 7A, taken along the line marked VIIB-VIIB in FIG. 7A.

DETAILED DESCRIPTION OF EMBODIMENTS

Figure 1:
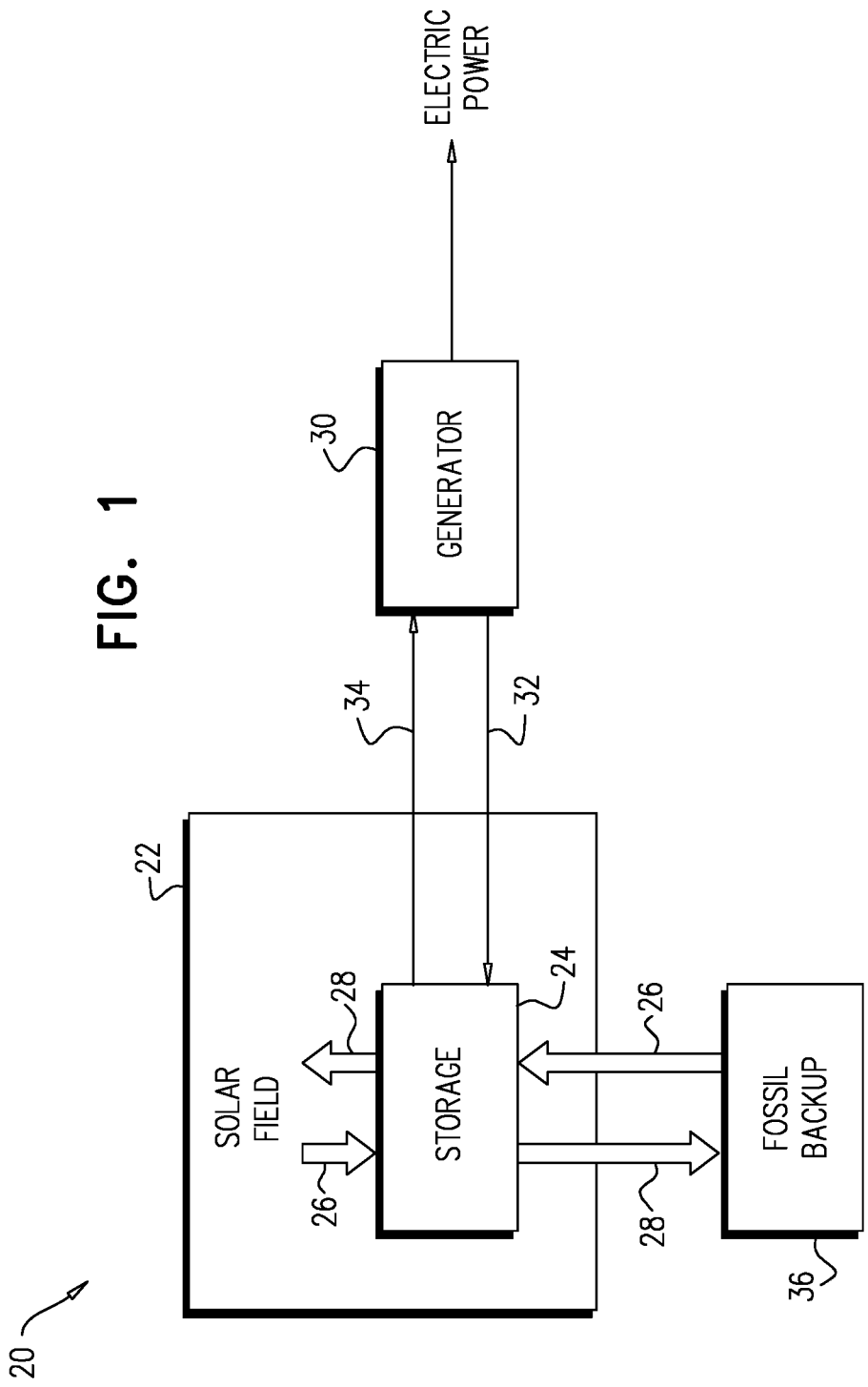
FIG. 1 is a block diagram that schematically illustrates a thermal energy system, in accordance with an embodiment of the present invention.

Because solar energy sources are inherently diurnal, energy storage is a necessary and crucial part of solar power systems. Existing solutions for storage of heat generated by thermal solar systems, however, tend to be costly, voluminous and difficult to maintain.

Embodiments of the present invention that are described herein provide novel apparatus and methods for heat storage, which are optimized to make energy-efficient and cost-effective use of solar thermal energy. The disclosed embodiments provide heat storage apparatus that integrates several functions that are normally implemented by separate components in installations that are known in the art: The apparatus not only stores heat generated by the solar collectors, but also serves as a heat exchanger to transfer the heat to fluid that is used by target equipment, such as to drive a turbine. Furthermore, the apparatus is capable of receiving supplemental heat, from a backup energy source (such as a fossil fuel burner), in order to heat the fluid to a desired temperature under all conditions. In addition, in some embodiments, the apparatus contains a novel piping system, in which heated fluid enters the apparatus directly from each of the solar collectors, obviating the need for a separate piping header.

In the disclosed embodiments, heat transfer tubes are deployed in an enclosure, which is filled with earth or other heat storage media after deployment of the tubes. The heat transfer tubes receive fluid that is heated by the energy source (such as an array of solar collectors), and the medium covering and surrounding the tubes stores at least a portion of the heat from the fluid until it is discharged, to run a turbine, for example.

"Earth," in the context of the present description and in the claims, means solid matter that is excavated from the ground, such as sand, gravel and/or rocks. Although lower in heat capacity and conductance than some other storage media, earth has the advantages of being low in cost and readily available. In some embodiments, the enclosure for the heat transfer tubes is created by excavating a trench in the ground. Thus, the heat storage apparatus may be installed underground in the location at which the heat is to be generated, such as below the ground in a field where one or more solar collectors are to be deployed above the ground. Optionally, at least a part of the earth that was excavated may be used to refill the trench and cover the tubes. This sort of earth-based energy storage thus saves space and costs, as well as reducing the environmental impact of the installation. Alternatively, principles of the present invention may be implemented advantageously using above-ground enclosures, as well.

In some embodiments, two sets of heat transfer tubes are interleaved within the enclosure: a first set of tubes that receive the heated fluid from the energy source, and a second set of tubes containing another fluid, which is heated by transfer of heat from the first tubes. These second tubes are coupled to output the heated fluid when needed, to drive the turbine of an electrical generator, for example. The two sets of heat transfer tubes may be arranged to run through the enclosure along parallel paths, but in opposite directions. In other words, the first and second heat transfer tubes are coupled respectively to the energy source and the turbine so that heated first fluid enters the first heat transfer tubes at a first end and releases heat along the respective path, while the cool second fluid enters the second heat tubes at the second end and exits from the first end at high temperature after receiving heat from the first fluid and the surrounding earth along the way. (The terms "first end" and "second end" are used arbitrarily in the present description and in the claims, simply to denote opposite ends of the array of heat transfer tubes.)

Figure 2:
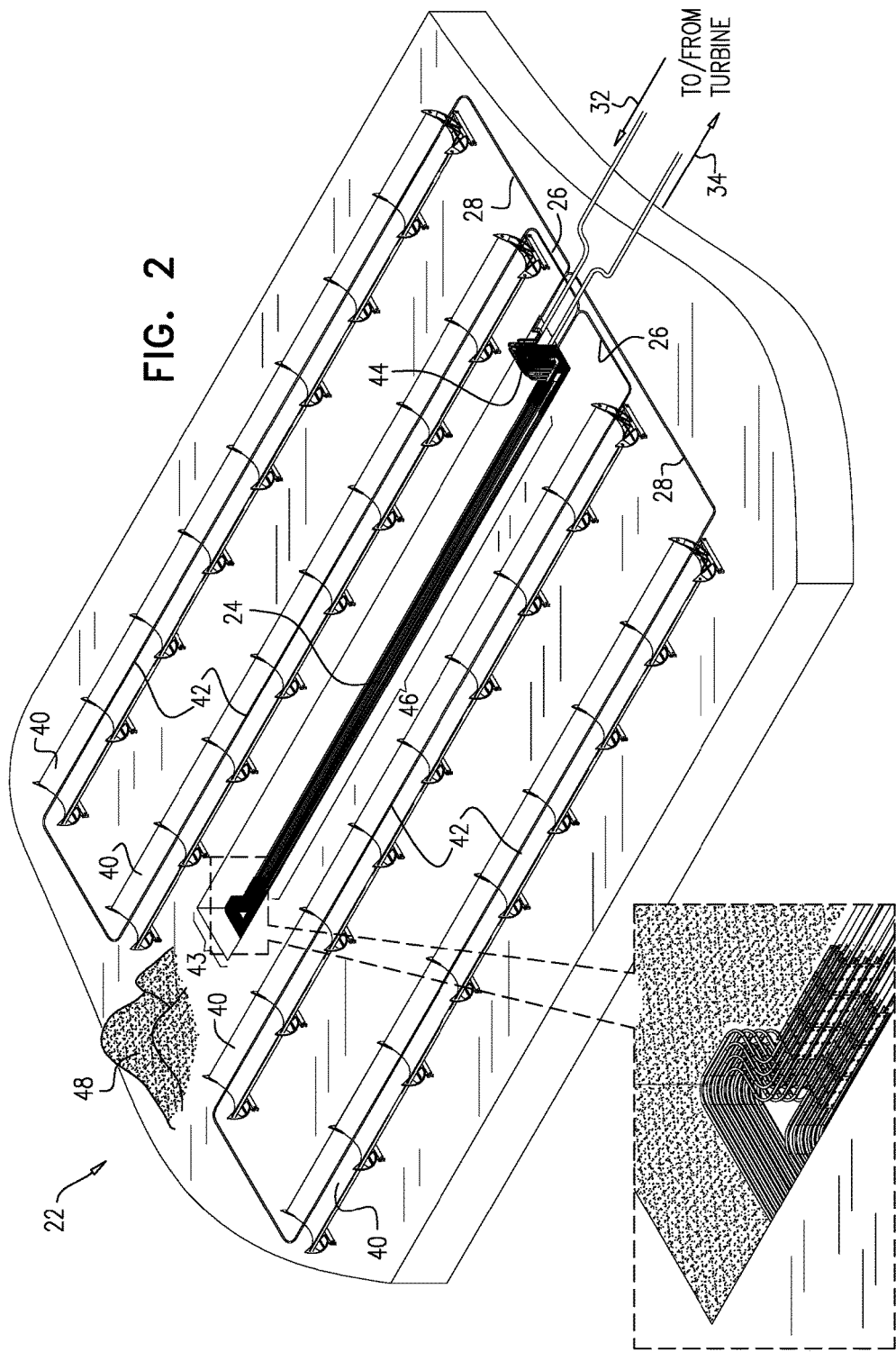
FIG. 2 is a schematic, pictorial illustration of a solar field with thermal energy storage, in accordance with an embodiment of the present invention.

FIG. 1 is a block diagram that schematically illustrates a thermal energy system 20, in accordance with an embodiment of the present invention. A solar field 22 (as shown in FIG. 2, for example) collects solar energy in a heat transfer fluid, and conveys the heated fluid via suitable hot transfer pipes 26 to heat storage apparatus 24. The heat is transferred from the storage apparatus via an output pipe 34 to target equipment, typically (although not necessarily) an electrical generator 30, such as a steam-driven turbine. In the embodiments described below, pipe 34 contains a second heat transfer fluid, which is separate from that used to transfer heat to storage apparatus 24 from solar field 22 and which extracts the stored heat by heat exchange in the storage apparatus. In alternative embodiments, however, the same fluid may be used for both purposes. Fluid that has been cooled by running the turbine is returned from generator 30 to storage apparatus 24 via an input pipe 32, while fluid cooled by heat exchange in the storage apparatus is returned via cool transfer pipes 28 to be reheated by solar field 22.

Solar field 22 with storage apparatus 24 may be deployed as an integral unit, which collects and stores heat during daylight hours and releases the heat to generator 30 as and when needed, during the day or night. In some cases (such as in winter and periods of bad weather, for example), the solar field may not generate sufficient heat to meet the power needs of the generator. To deal with such situations, system 20 may comprise a backup energy source 36, which is capable, when necessary, of heating the fluid for input to storage apparatus 24 in a manner that is not dependent on solar energy, thus supplementing the heat provided by the solar field. Source 36 may generate heat by combustion of a fuel, such as a fossil fuel, for example.

Pipes 26 and 28 typically couple backup energy source 36 to the same set of heat transfer tubes in storage apparatus 24 that are fed by solar field 22. Pipes 26 and 28 may be routed so that the solar field and backup energy source are connected to the same fluid loop, feeding the same heat exchanger in apparatus 24, as described below. As a result, the storage apparatus is able to provide the requisite heated fluid to generator 30 regardless of the season, the weather, and the time of day. The modularity of system 20 is also maintained, so that generator 30 receives of its the heated fluid at all times from this system, with no need for connection of other sources of hot fluid. Backup energy source 36 may also be operated so as to draw energy (such as natural gas) during hours at which the tariff is low, while apparatus 24 is operated to release energy to generator 30 at high-tariff hours.

In some cases, the backup energy source may heat the heat transfer fluid simultaneously with heating by the solar collectors. This mode of operation is useful particularly when generator 30 requires at least a certain threshold temperature level of the second fluid for its operation. In this case, a small investment of energy in operating backup energy source 36, in order to raise the temperature in storage apparatus 24, can make the entire amount of heat collected by the apparatus from solar field 22 available for electric energy generation.

Various modes of operation of system 20 are made possible by the novel system configuration described above and by the design of storage apparatus 24 that is shown and described further hereinbelow. For example, apparatus 24 may simultaneously receive heat from the first fluid and release at least a part of the heat to the second fluid for driving generator 30. The rate of discharge of the heat from the apparatus can be controlled simply by regulating the rate of outflow of the heated second fluid through pipes 34. In this manner, it is possible to transfer out all of the heat brought in through pipes 26, or only a part of this heat, or to store all of the received heat for later use. This functionality is achieved without using complex valve systems or algorithms, and the rate of heat discharge is regulated without the need for adjustment of any valves other than to control the total flow rate.

FIG. 2 is a schematic, pictorial illustration of solar field 22 with thermal energy storage apparatus 24, in accordance with an embodiment of the present invention. In the pictured embodiment, field 22 comprises solar collectors 40 in the form of parabolic troughs, which concentrate the rays of the sun to heat a heat transfer fluid in tubes 42. This configuration of the solar collectors and associated tubing is shown solely by way of example, however, and storage apparatus 24 may similarly be used in conjunction with thermal solar collectors of substantially any other type that is known in the art, as well as with other sources of thermal energy, not only solar.

Field 22 may operate on principles similar to the solar thermal energy system that is described in Israel Patent Application 225,456, entitled "Modular Solar Field," filed Mar. 24, 2013, whose disclosure is incorporated herein by reference. In this system, each solar trough is made up of modules, wherein each module comprises a frame made up of end segments and other structural elements. The frame has an outer edge with a circular profile and an inner edge of parabolic profile, which holds multiple mirror segments. A motorized drive rotates the outer edge of the frame about the center line of the frame, which is also the focal line of the parabolic profile, in order to track the sun's motion. The heat transfer fluid flows through heat transfer tube 42, which is held stationary along this center line and absorbs heat from the sun that is concentrated by the parabolic mirror segments.

Heat transfer apparatus 24 is contained in a trench 43, which is excavated below the ground in field 22 and serves as the enclosure for an array 46 of heat transfer tubes (shown in detail in the figures that follow). Some of these tubes are connected by a manifold 44 to pipes 26 and 28, which respectively transfer hot fluid from tubes 42 to array 46 and return cooled fluid to tubes 42 thereafter. Other tubes in array 46 are connected by manifold 44 to pipes 32 and 34, which transfer fluid from and to generator 30.

In this sort of system, a fluid that is gaseous at standard temperature and pressure (STP —273° K and 1 atm), such as carbon dioxide, may advantageously be used as the heat transfer fluid in tubes 42 (which is also conveyed via pipes 26 and 28 to and from apparatus 24). The heat transfer properties of the gas may be enhanced by addition of a heavy rare gas, such as argon, krypton or xenon. A fluid that is liquid at STP, such as water (which is typically vaporized during operation of system 20) may be used as the heat transfer fluid conveyed from and to generator 30 in pipes 32 and 34. Alternatively, however, substantially any suitable sorts of gases or liquids (including molten metals or salts) may be used for these purposes, depending on the design of the relevant system components.

After array 46 is installed in trench 43, the trench is filled with earth 48. In some installations, at least a part of the earth fill was previously excavated from the ground of field 22 in the course of creating the trench. This back-filled earth covers array 46 and fills the spaces between the tubes in the array, thus serving as the heat storage medium of apparatus 24. Although trench 43 is shown in this embodiment as a long, narrow hole in the ground, substantially any suitably-shaped hole may be used for the purposes of apparatus 24, and the term "trench" should be understood in the present description and in the claims to encompass holes of all such shapes.

The inventors have found that igneous rock, such as granite or basalt, is particularly useful as a heat storage medium, in that it is both inexpensive and has high heat capacity. (The rock may be dug locally, from the area of the solar field, if available, or transported to the site.) In some embodiments, at least 50% by volume of the heat storage medium in trench 43 (or in whatever enclosure is used by apparatus 24) consists of igneous rocks. An external insulating layer comprising tuffaceous rock (which is also igneous) may be deployed around the inner perimeter of the enclosure.

For good heat transfer and storage, it is important that the spaces between the igneous rocks be filled. For this purpose, a particulate material, such as pulverized igneous rock, may be poured over the rocks so as to fill the spaces. Optionally, the particulate material may contain metal fragments in order to improve its heat conductivity. After the particulate material has been poured into the enclosure, the entire mass of rock and particles may be compacted, by vibration, for example, and then wetted with water or another fluid. These latter steps cause the particles to fill in all the gaps between the rocks and then to harden around the heat transfer tubes, thus providing a solid, stable heat storage medium.

The result of the above features is a storage medium that is low in cost and, at the same time, well insulated with minimal heat loss to the environment.

Figure 3:
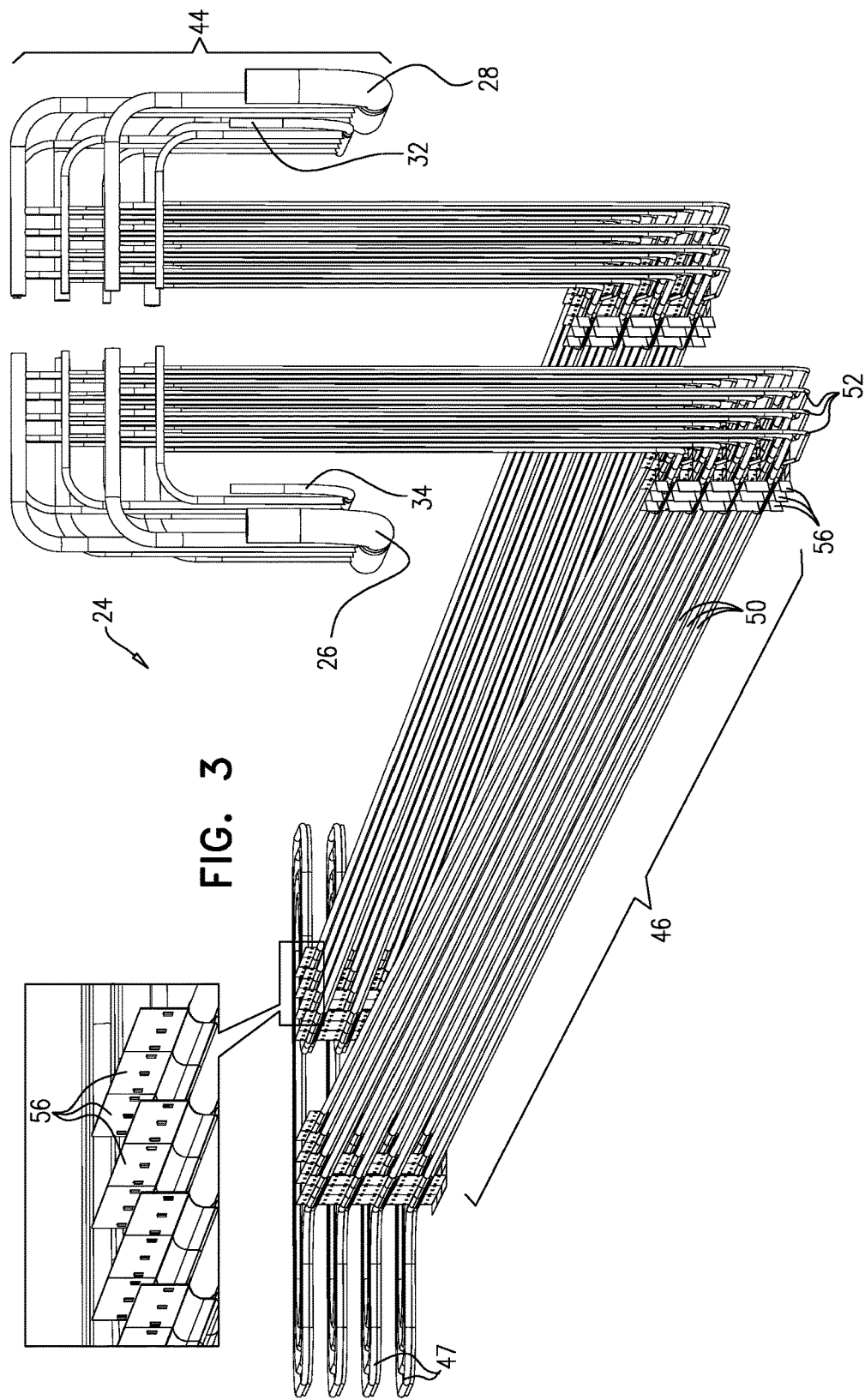
FIG. 3 is a schematic, pictorial illustration of tubing used in thermal energy storage apparatus, in accordance with an embodiment of the present invention.

FIG. 3 is a schematic, pictorial illustration showing details of manifold 44 and array 46 in apparatus 24, in accordance with an embodiment of the present invention. Pipes 26 and 28, carrying the heat transfer fluid from and to the solar collectors, are connected via manifold 44 to first heat transfer tubes 50 in array 46. Second heat transfer tubes 52, interleaved with tubes 50 in the array, are connected via the manifold to pipes 32 and 34. As noted earlier, tubes 50 may contain carbon dioxide, for example, while tubes 52 contain water, but other sorts of fluids may alternatively be used. Fins 56 are coupled externally to tubes 50 and 52 in order to facilitate transfer of heat between the tubes and the earth filling trench 43.

Heat transfer tubes 50 and 52 run through trench 43 along parallel, respective paths between the ends of the interleaved tubes at manifold 44. Thus, heated fluid from pipe 26 enters tubes 50 at a first end of array 46 (corresponding to the left side of manifold 44 in FIG. 3) and cools along the respective path of tubes 50. The cooled fluid then exits from the second end through pipe 28, from which it is returned to solar field 22 for re-heating. Cool fluid returning from generator 30 enters tubes 52 via pipe 32 at the second end of array 46 (at the right side of manifold 44), receives heat from the fluid in tubes 50 and from the earth along the path through trench 43, and then exits at high temperature via pipe 34 at the first end of the array. Each tube 52 may be coupled closely to a corresponding tube 50, possibly with the outer surfaces of the tubes in mutual contact, in order to facilitate heat transfer. Tubes 50 and 52 in this embodiment run along linear paths, from manifold 44 along the length of trench 43 to a bent section 47, from which the tubes return along the length of the trench to the manifold.

Figure 4:
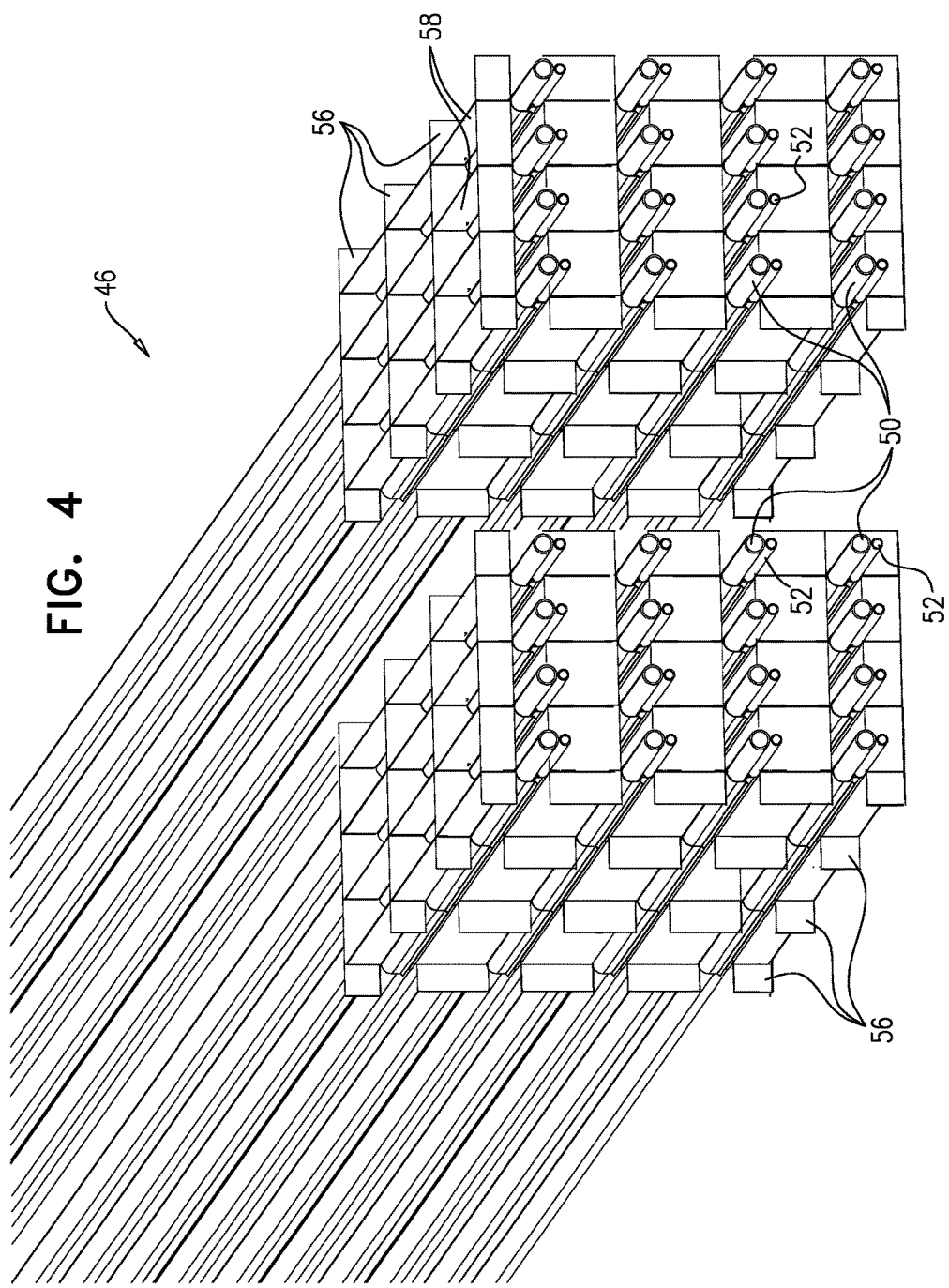
FIG. 4 is a schematic detail view of heat distribution fins that are associated with tubing in thermal energy storage apparatus, in accordance with an embodiment of the present invention.

FIG. 4 is a schematic detail view of array 46, showing heat distribution fins 56 and 58 that are associated with tubes 50 and 52, in accordance with an embodiment of the present invention. Fins 56 and 58 typically comprise a suitable sheet metal, such as steel or aluminum, and may be arrayed transversely to tubes 50 and 52 (fins 56) or longitudinally along the (fins 58), or in both directions as shown in the figure. Although the fins are shown in FIGS. 3 and 4, for the sake of simplicity, along only a part of array 46, in practice the fins are generally deployed along the entire length of the array. The spaces between fins 56 and 58 are filled with earth, and the fins are thus useful in transferring thermal energy to and from the earth, which is itself typically a poor conductor of heat.

Figure 5A:
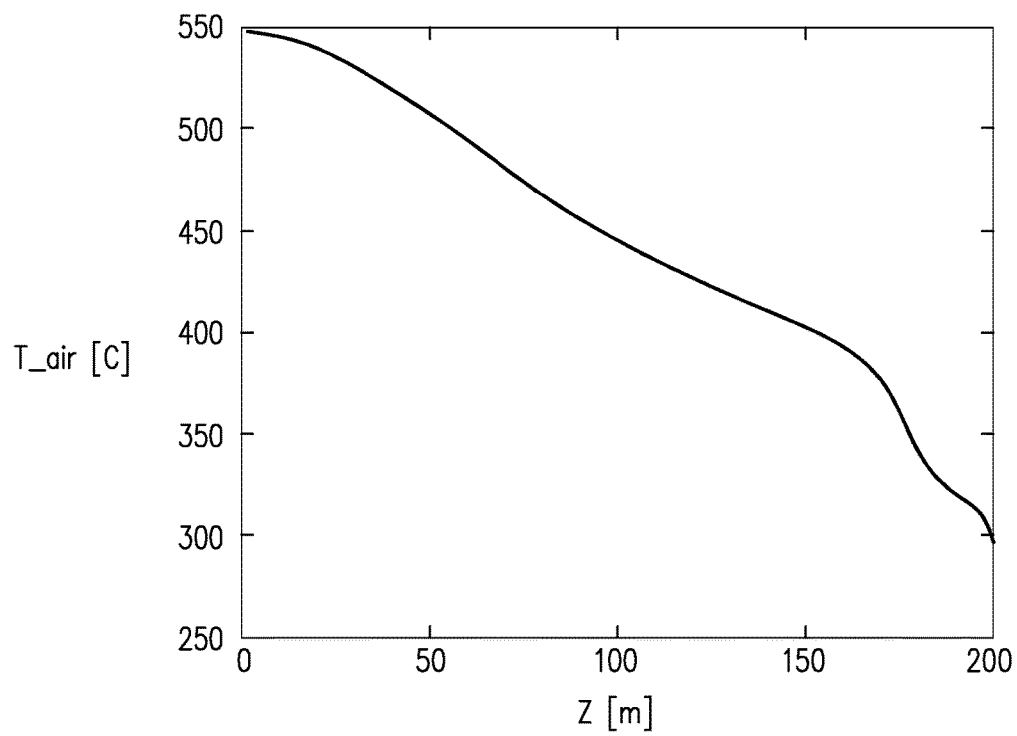
FIGS. 5A and 5B are schematic plots of gas and water temperature gradients, respectively, along the length of energy storage tubing, in accordance with an embodiment of the present invention.
Figure 5B:
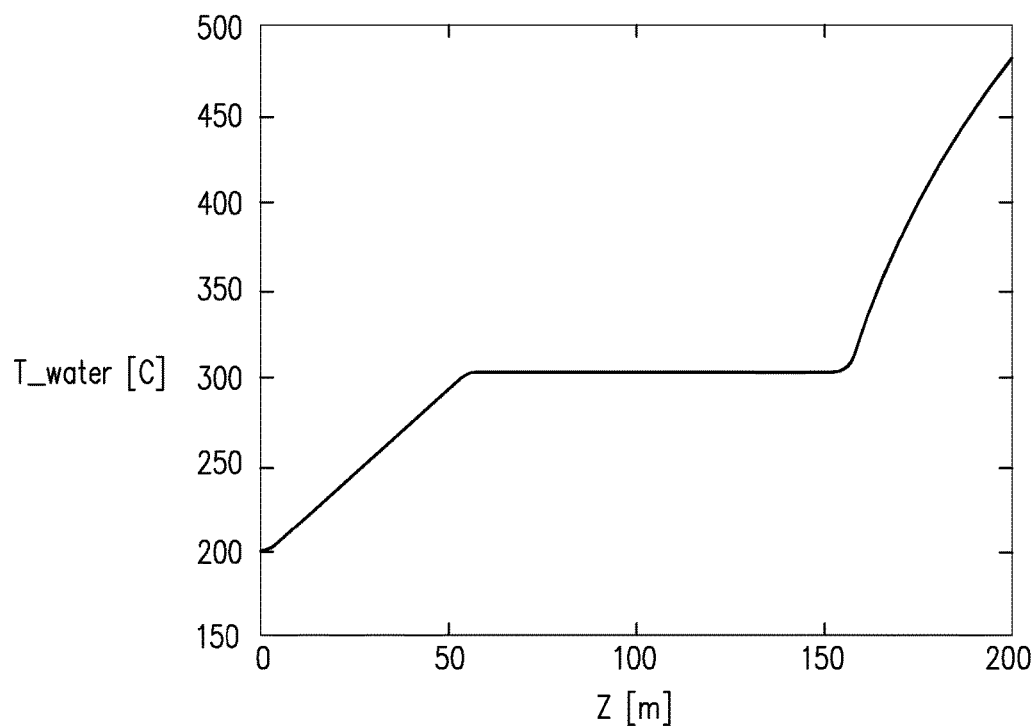

FIGS. 5A and 5B are schematic plots of temperature gradients along the length of tubes 50 and 52, respectively, in array 46, in accordance with an embodiment of the present invention. The total length of array 46, including bent section 47, is 200 m in this example. The horizontal axes in the two figures run along the length of the respective tubes in the direction of flow, meaning that the axes correspond to opposite directions along array 46. The plots are based on a calculated simulation model of apparatus 24, assuming that carbon dioxide gas flows through tubes 50, while water vapor flows through tubes 52.

Gas that has been heated by solar collectors 40 to a temperature of 550° C. enters tubes 50 via pipe 26 and transfers heat to the surrounding earth and to tubes 52. As a result, the gas cools along the length of tubes 50 and exits via pipe 28 at a temperature of about 300° C. At the same time or at a later time, water vapor enters tubes 52 via pipe 32 at a temperature of 200° C. and receives heat from tubes 50 and the surrounding earth along the length of the tubes. Consequently, the water vapor is heated along the length of array 46 and exits tubes 52 via pipe 34 at a temperature of about 480° C. The parallel temperature gradients in tubes 50 and 52 thus facilitate efficient heat transfer between the respective heat transfer fluids and enable system 20 to provide high-temperature fluid to drive generator 30.

Figure 6:
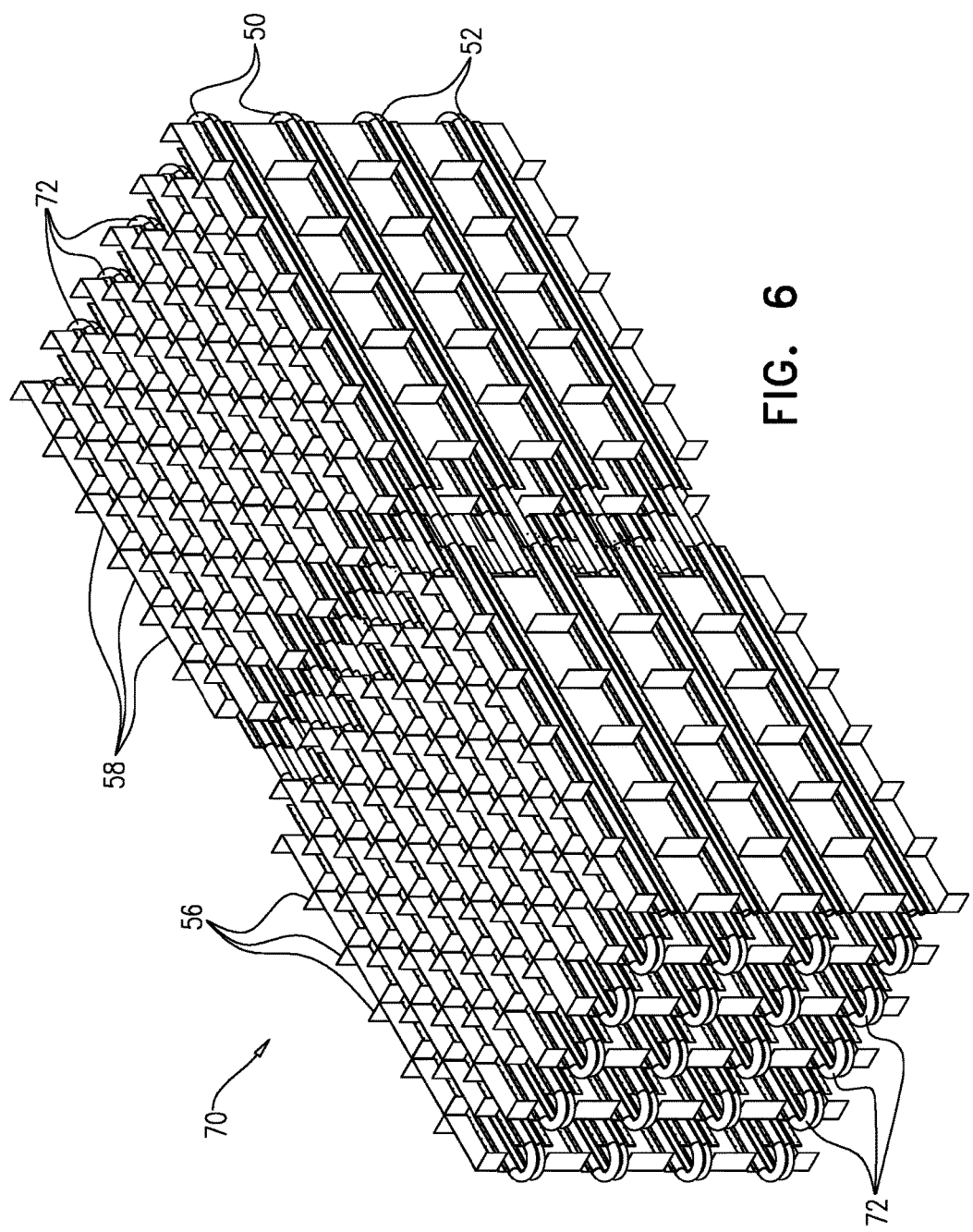
FIG. 6 is a schematic, pictorial illustration of tubing used in thermal energy storage apparatus, in accordance with an alternative embodiment of the present invention.

FIG. 6 is a schematic, pictorial illustration of an array 70 of tubes 50 and 52, which may be used in thermal energy storage apparatus 24 in place of array 46, in accordance with an alternative embodiment of the present invention. Whereas tubes 50 and 52 in array 46 are largely linear, the tubes in array 70 follow serpentine paths, along which each tube undergoes multiple bends 72. Fins 56 and 58 are coupled to the tubes in a manner similar to that described above. The serpentine tubing configuration of FIG. 6 may be advantageous in facilitating more complete and effective heat transfer, but it is likely to be more difficult and costly to assemble in the field than the simple, linear configuration of array 46.

FIGS. 7A and 7B schematically illustrates heat storage and transfer apparatus 80, in accordance with an embodiment of the present invention. FIG. 7A is a top view, while FIG. 7B is a sectional view taken along the line marked VIIB-VIIB in FIG. 7A. Apparatus 80 may be used in place of storage apparatus 24 in system 20, in a manner similar to that shown in solar field 22 in FIG. 2, except that in the present embodiment, solar collectors 40 are perpendicular to the longitudinal axis of apparatus 80, rather than parallel to apparatus 24 as in FIG. 2.

In other words, solar collectors 40 in the system configuration of FIGS. 7A and 7B are arranged in an array with their axes mutually parallel (typically running in a north-south direction), while the longitudinal axis of apparatus 80—meaning the long axis, along which the heat transfer tubes run—is perpendicular. This configuration makes it possible for apparatus to be positioned adjacent to the ends of the solar collectors. This perpendicular arrangement of collectors and heat storage apparatus is advantageous in reducing the length and complication of hot transfer pipes 26 between collectors 40 and apparatus 80, and effectively eliminates the need for an external header manifold connecting to apparatus 80. This approach reduces the costs of piping, insulation, and header foundations, as well as reducing heat loss between collectors 40 and apparatus 80.

Apparatus 80 in this embodiment is contained in a trench 43, with supporting walls 82 that typically comprise an insulating material. Hot transfer pipes 26, which convey the heated fluid from each of the solar collectors into apparatus 80, lead directly into apparatus 80 from solar collectors 40 on both sides, so that each of the hot transfer pipes enters enclosure 43 at a point adjacent to the end of the respective solar collector. These pipes 26 meet at junctions 84 above trench 43, from which vertical pipes 88 convey the hot fluid to respective header pipes 86, contained within the heat storage medium in the trench. An inlet connection manifold 90, also contained within the trench, distributes the hot fluid to heat transfer tubes 50. (Heat transfer tubes 52, which receive the heat transferred from tubes 50, are omitted from FIGS. 7A and 7B for the sake of simplicity.) As a result of this arrangement, essentially no heat is lost to the surrounding environment from pipes 86 and 88 and manifold 90.

The hot fluid in tube 50 transfers heat to the storage medium and to tubes 52, and thus cools as it moves through trench 43 to an outlet manifold 92. Tubes 50 may be connected to manifold 92 by flexible couplings. Manifold 92 terminates in an output junction 96, connecting to cool transfer pipe 28, which conveys the cool fluid back to the far ends of collectors 40 (not shown in this figure).

Alternative tubing configurations that can be used in apparatus 24 and apparatus 80, as described above, will be apparent to those skilled in the art after reading the preceding description and are also considered to be within the scope of the present invention.

Although the embodiments described above refer specifically to the use of solar thermal energy in driving an electrical turbine, the principles of generation and storage of thermal energy that are described above may alternatively be applied in driving other sorts of target equipment, such as heat-driven chemical and industrial works. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for energy storage, comprising:
   providing an enclosure;
   interleaving first and second heat transfer tubes within the enclosure by running the first and second heat transfer tubes through the enclosure along parallel, respective paths between first and second ends of the interleaved tubes;
   coupling the first heat transfer tubes to receive a first fluid heated by an energy source so that the heated first fluid enters the first heat transfer tubes at the first end and cools along the respective path before exiting from the second end;
   coupling the second heat transfer tubes to receive a second fluid, which enters the second heat transfer tubes at the second end, to heat the second fluid by transfer of heat from the first fluid, while the first and second fluids flow in opposite directions along the respective parallel paths, and to output the heated second fluid from the first end as steam at a temperature in excess of 400° C. to drive a turbine;

filling the enclosure containing the interleaved first and second heat transfer tubes with a heat storage medium comprising pulverized rock; and controlling a flow of the second fluid through the second heat transfer tubes so as to simultaneously receive the heat from the first fluid and release at least a part of the heat for driving the turbine, while a remainder of the heat from the first fluid is stored by the heat storage medium for subsequent heating of the second fluid.

2. The method according to claim 1, wherein providing the enclosure comprises:

excavating a trench, thereby removing earth from the ground;

wherein filling the enclosure comprises:

filling the trench so as to cover the heat transfer tubes with the earth that was removed from the ground, whereby heat transferred to the tubes by the heated fluid is stored at least partly by the earth in the trench.

3. The method according to claim 1, wherein at least 50% by volume of the heat storage medium consists of igneous rocks.

4. The method according to claim 3, wherein filling the enclosure comprises deploying an external insulating layer comprising tuffaceous rock around an inner perimeter of the enclosure.

5. The method according to claim 3, wherein filling the enclosure comprises filling spaces between the igneous rocks with a particulate material comprising the pulverized rock.

6. The method according to claim 5, wherein the pulverized rock comprises pulverized igneous rock.

7. The method according to claim 5, wherein the particulate material comprises metal fragments.

8. The method according to claim 1, wherein filling the enclosure comprises compacting and then wetting the heat storage medium.

9. The method according to claim 1, wherein the first heat transfer tubes are coupled so that the cooled first fluid returns from the second end to be re-heated by the energy source, and wherein the second heat transfer tubes are coupled to receive the second fluid that has been cooled in driving the turbine.

10. The method according to claim 1, wherein the first fluid is gaseous at standard temperature and pressure (STP), while the second fluid is liquid at STP.

11. The method according to claim 10, wherein the first fluid comprises carbon dioxide, and the second fluid comprises water.

12. The method according to claim 1, wherein the first fluid comprises a rare gas selected from a group of rare gases consisting of argon, krypton and xenon.

13. The method according to claim 1, wherein interleaving the first and second heat transfer tubes comprises coupling fins externally to the first and second heat transfer tubes so as to facilitate transfer of the heat to the earth.

14. The method according to claim 1, wherein providing the enclosure comprises excavating a trench to serve as the enclosure below the ground in a field, and wherein the method comprises deploying one or more solar collectors above the ground in the field to serve as the energy source.

15. The method according to claim 14, wherein the solar collectors have respective first and second ends and respective collector axes, extending between the first and second ends, that are mutually parallel along a first direction, and wherein the enclosure has a longitudinal axis that runs in a second direction, perpendicular to the first direction, and is positioned adjacent to the first ends of the solar collectors.

16. The method according to claim 15, wherein coupling the first heat transfer tubes to receive the first fluid comprises coupling a connection manifold to receive the heated fluid from the solar collectors and to distribute the heated fluid to the first heat transfer tubes, wherein the connection manifold is contained within the heat storage medium in the enclosure.

17. The method according to claim 1, and comprising:

coupling one or more solar collectors to heat the first fluid for input to the first heat transfer tubes;

providing a backup energy source to heat the first fluid by combustion of a fuel; and coupling the backup energy source to convey the heated first fluid to the first heat transfer tubes so as to supplement the heat provided by the solar collectors.

18. The method according to claim 17, wherein coupling the backup energy source comprises heating the first fluid using the backup energy source simultaneously with heating of the first fluid by the solar collectors.

19. The method according to claim 17, wherein the solar collectors heat the first fluid during daylight hours, and wherein the heat storage medium is configured to receive and store the heat from the first fluid during the daylight hours and to release at least a part of the heat to the second fluid during nighttime hours.

20. The method according to claim 1, wherein controlling the flow comprises controlling a rate of discharge of the heat from the heat storage medium by regulating the flow of the second fluid through the second heat transfer tubes.

21. The method according to claim 20, wherein controlling the rate of the discharge comprises regulating the discharge without adjustment of valves other than to control a total flow rate.

* * * * *